US007299942B2

(12) United States Patent
Edens et al.

(10) Patent No.: US 7,299,942 B2
(45) Date of Patent: Nov. 27, 2007

(54) SYSTEM FOR STORING AND DISPENSING PAPER CLIPS

(75) Inventors: Michelle O. Edens, 5510 Richard Ave., Dallas, TX (US) 75206; Ronald W. Burns, Frisco, TX (US)

(73) Assignee: Michelle O. Edens, Dallas, TX (US)

(*) Notice: Subject to any disclaimer, the term of this patent is extended or adjusted under 35 U.S.C. 154(b) by 374 days.

(21) Appl. No.: 10/887,594

(22) Filed: Jul. 9, 2004

(65) Prior Publication Data

US 2006/0006191 A1 Jan. 12, 2006

(51) Int. Cl.
*B23Q 7/04* (2006.01)
*B65G 59/04* (2006.01)
*B65H 3/16* (2006.01)
*G07F 11/10* (2006.01)

(52) U.S. Cl. ...................... 221/212; 221/197; 221/261; 221/198; 29/212

(58) Field of Classification Search ................ 221/289, 221/255, 270, 271, 272, 274, 276
See application file for complete search history.

(56) References Cited

U.S. PATENT DOCUMENTS 2,833,028 A * 5/1958 Treimann .................... 221/281
2,835,027 A * 5/1958 Phillips ........................ 29/809
2,939,619 A 6/1960 Levesque
3,100,932 A * 8/1963 Pipkin ......................... 221/276
3,170,596 A 2/1965 Nyberg
3,235,950 A * 2/1966 Smotzer, Jr. ................ 221/276
3,324,538 A * 6/1967 Christensen ................. 29/814
3,422,989 A * 1/1969 Long, Jr. .................... 221/186
3,786,959 A * 1/1974 Greb et al. ................. 221/261
3,793,696 A 2/1974 Barr et al.
4,047,637 A 9/1977 Grunstad et al.
4,238,051 A * 12/1980 Sherman ..................... 221/205
4,354,619 A * 10/1982 Wippermann et al. ....... 221/263
4,530,445 A * 7/1985 Decker ....................... 221/198
D285,703 S 9/1986 Decker
4,796,780 A 1/1989 Huang
5,078,300 A * 1/1992 Heu ............................ 221/212
5,096,091 A * 3/1992 Heu ............................ 221/212
D345,378 S 3/1994 Hu
5,335,822 A * 8/1994 Kasper ....................... 221/259

(Continued)

FOREIGN PATENT DOCUMENTS

GB 2241693 A * 9/1991
WO WO 02/28217 A2 4/2002

*Primary Examiner*—Gene O. Crawford
*Assistant Examiner*—Rakesh Kumar

(57) ABSTRACT

The present invention defines a system (100) for one-at-a-time paper clip dispensing. The system includes a housing (102), and a retrieval receptacle (114) disposed somewhere along the exterior of the housing. A storage component (104) is disposed along or within the housing, and is adapted to receive loose paper clips. A gate component (106) is operably coupled to the storage component, and a sorting component is incorporated within the storage or gate component(s). An actuating system (110) is disposed somewhere within or along the housing. A retrieval system (112) is disposed between the receptacle and the storage component. The retrieval system is adapted to retrieve a single paper clip from the gate component, and deliver the paper clip to the receptacle, responsive to activation of the actuating system.

31 Claims, 9 Drawing Sheets

U.S. PATENT DOCUMENTS

| | | | | |
|---|---|---|---|---|
| 5,842,598 | A * | 12/1998 | Tsuchida | 221/258 |
| 5,971,206 | A | 10/1999 | Manukyan | |
| D432,170 | S | 10/2000 | Chan | |
| 6,206,236 | B1 | 3/2001 | Hakala | |
| 6,539,619 | B2 | 4/2003 | Hakala | |
| 2001/0013521 | A1* | 8/2001 | Hakala | 221/276 |

* cited by examiner

FIG. 5a
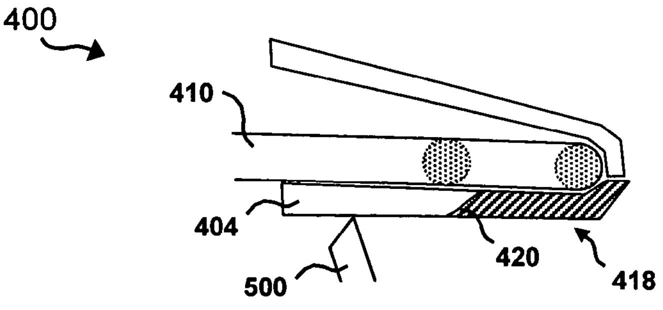
FIG. 5b
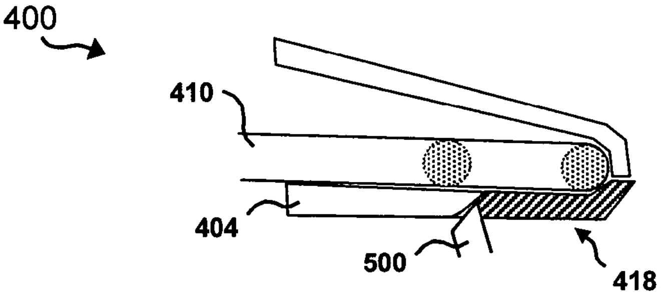
FIG. 5c
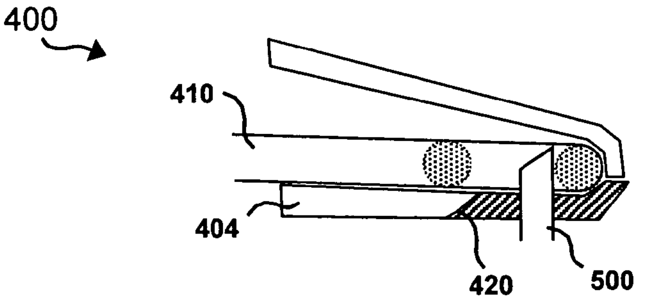
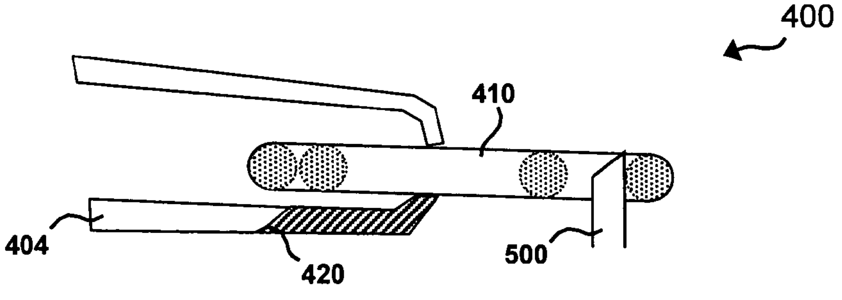
FIG. 5d

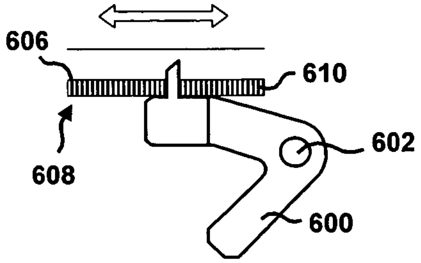
FIG. 6a
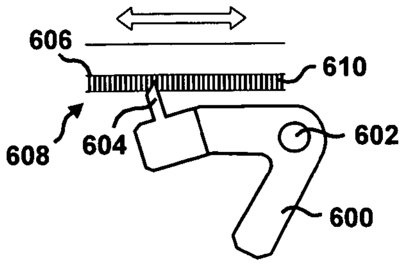
FIG. 6b
FIG. 7a
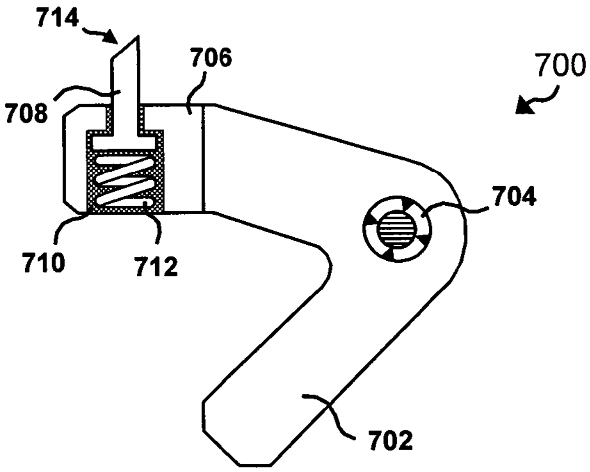
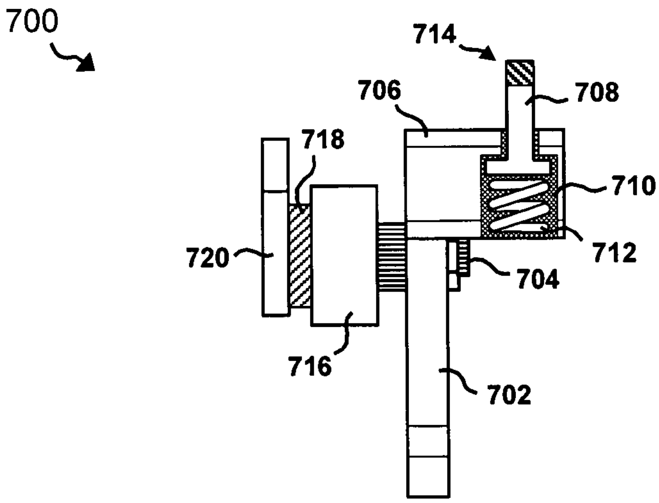
FIG. 7b

SYSTEM FOR STORING AND DISPENSING PAPER CLIPS

TECHNICAL FIELD OF THE INVENTION

The present invention relates generally to the field of office supplies and equipment and, more particularly, to apparatus and methods for storing and dispensing paper clips.

BACKGROUND OF THE INVENTION

Conventional paper clip dispensers are ubiquitous. A number of both automated and manual paper clip dispensers are widely available to consumers. Each such type of conventional dispenser purports to have certain advantages over the others. Each such type of conventional dispenser also has certain limitations or drawbacks.

Automated conventional dispensers typically offer very fast dispensing of paper clips, often one at a time. Such dispensers generally relieve a user from having to manually pick through or untangle a cluster of paper clips in order to retrieve a single clip. Unfortunately, such systems usually cost more to purchase and operate than comparable manual systems. Such systems typically require electric power, and must thus consume power from either a battery or power outlet source. Furthermore, such systems may require the purchase and use of special, pre-loaded paper clip supplies in order to operate properly. Alternatively, such systems may require labor-intensive pre-loading of paper clips into specialized clips or hoppers essential to automated dispensing. In many cases, only a limited, relatively small number of paper clips may be loaded at one time—resulting in more frequent refills. Thus, overall, the convenient, one at a time dispensing of such conventional automated systems is usually paid for either with up-front labor or monetary costs.

In contrast, conventional manual dispensers are often simple and cheap. Such manual dispensers typically do not require any power source, other than user manipulation. Generally, with conventional manual dispensers, a user quickly loads a small supply of paper clips into some sort of storage compartment—usually with little or no effort given to presorting or arranging the clips.

Most often, however, conventional manual dispensers do not provide one at a time dispensing. A user must manually pick through or untangle a cluster of paper clips in order to retrieve a single clip from the storage compartment. Some conventional systems rely on a magnetic means to capture a small number of paper clips from the storage compartment. With such conventional systems, a user must exert some force or effort (e.g., shaking the dispenser, pushing a magnet down into the storage compartment) to cause the magnetic means to capture some number of paper clips. Again, such dispensing usually does not provide one at a time dispensing, as the user is left to pick through whatever number of clips that the magnetic means happened to retrieve. Repeated manipulations are frequently required. In some cases, a user may have to exert a certain amount of effort to separate a paper clip from the magnetic means.

A small number of conventional manual dispensers do provide one at a time dispensing. Unfortunately, however, such conventional dispensers generally require some amount of laborious pre-loading, such as loading paper clips into a spring-loaded cartridge. Furthermore, such conventional dispensers only hold a relatively small number of paper clips per loading, requiring frequent reloading by a user.

As a result, there is a need for a system for storing and dispensing paper clips that provides certain advantages and conveniences of conventional paper clip dispensers, while overcoming numerous limitations and disadvantages of those dispensers. This new system should provide one at a time paper clip dispensing in an easy and economically manner. This new system should require minimal user effort to load and dispense paper clips. This new system should be able to store a large number of paper clips, reducing the frequency of refills. This new system should be relatively inexpensive to produce, and incur little or no maintenance or operation costs, other than the cost of paper clips. This new system should provide all such benefits in a versatile and flexible manner, such that the system may be produced in a number of different aesthetic styles to satisfy consumer demands.

SUMMARY OF THE INVENTION

The present invention provides a versatile system for storing and dispensing paper clips in an easy and economical manner. The system of the present invention provides one at a time paper clip dispensing from a manual system. The present invention requires minimal effort to load and dispense paper clips. A user pours or places a supply of paper clips into a storage compartment (e.g., hopper, bin)—one that is able to store a relatively large number of paper clips. When a paper clip is needed, the user activates an actuating mechanism (e.g., a push button, a lever) and a single paper clip is retrieved from the storage compartment and delivered to a receptacle. The user retrieves the single paper clip from the receptacle quickly and easily, and the system is immediately ready to dispense another paper clip. The systems and components throughout the present invention are versatile in their form and function. The present invention may thus be economically produced in a wide variety of aesthetic styles and forms, catering to a wide range of consumer demands. The present invention thus provides manual, one at a time paper clip dispensing in an easy, efficient and cost-effective manner.

The system of the present invention provides a housing within or about which a number of subsystems or components are disposed. This housing may be configured, shaped or otherwise formed to address aesthetic desires. The present invention provides a storage component that collects and holds paper clips for dispensing. The present invention provides a sorting component, which manipulates paper clips in order to facilitate one at a time dispensing. The present invention provides a gate component, which facilitates removal of a single paper clip from the storage component. A retrieval system, upon stimulus from a user-initiated actuating system, conducts a single paper clip from the gate component to a retrieval receptacle. The user retrieves the paper clip from the receptacle, and the system is ready to dispense another paper clip.

More specifically, the present invention provides a system for one-at-a-time paper clip dispensing. The system includes a housing, and a retrieval receptacle disposed somewhere along or within the exterior of the housing. A storage component is disposed along or within the housing, and is adapted to receive loose paper clips. A gate component is operably coupled to the storage component, and a sorting component is incorporated within the storage or gate component(s). An actuating system is disposed somewhere within or along the housing. A retrieval system is disposed between the receptacle and the storage component. The retrieval system is adapted to retrieve a single paper clip from the gate component, and deliver the paper clip to the receptacle, responsive to activation of the actuating system.

The present invention further provides a method of producing a manually operated, one-at-a-time paper clip dispenser. A housing is provided, having a retrieval receptacle disposed within or along its exterior. A storage component is disposed along the housing, and is adapted to receive loose paper clips and to align the loose paper clips along a desired axis. A gate component is provided, operably coupled to the storage component along the desired axis and adapted to dispense only one paper clip at a time. An actuating system is disposed along the housing. A retrieval system is disposed between the receptacle and the storage component, and is adapted to retrieve a paper clip from the gate component and deliver it to the receptacle responsive to the actuating system.

The present invention further provides a paper clip dispenser having a housing with a retrieval receptacle disposed along a side portion thereof. A trough-shaped, downwardly sloping storage component is disposed somewhere within or along the housing, and is adapted to receive loose paper clips through an upper opening that forces the loose paper clips into at least partial alignment with a desired axis. A gate component is operably coupled to the storage component, at the bottom of the storage component's downward slope, and is adapted to dispense paper clips one at a time. An actuating system is disposed along the housing and coupled to a retrieval system. The retrieval system has a retrieval channel disposed between the receptacle and the storage component, and a retrieval component with a retrieval member coupled to an upper portion thereof. The retrieval component is adapted to retrieve a paper clip from the gate component using the retrieval member, and to move the paper clip to the receptacle, responsive to the actuating system.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which:

FIGS. 5*a*-5*d* are illustrations depicting operation of the embodiment illustrated in FIGS. 4*a*-4*c;*

FIGS. 6*a*-6*b* are illustrations depicting certain aspects of one embodiment of a retrieval system according to the present invention;

FIGS. 7*a*-7*b* are illustrations depicting one embodiment of a retrieval component according to the present invention;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The invention will now be described and illustrated in conjunction with a system for storing and dispensing metallic, wire-type paper clips. The specific embodiments discussed herein are, however, merely illustrative of specific ways to make and use the invention and do not limit the scope of the invention.

A system according to the present invention stores and dispenses paper clips in an easy, economical and versatile manner. A system according to the present invention provides one at a time paper clip dispensing from a manually operated system. The present invention requires only minimal effort to load and dispense paper clips. A user pours or otherwise deposits a supply of paper clips into a storage compartment (e.g., hopper, bin). This storage compartment can be produced of any suitable or desired size, but is generally of a size sufficient to store a relatively large number of paper clips. When a user wants a paper clip, the user activates an easy-to-use actuating mechanism, such as a push button or a lever. Upon activation of the actuating mechanism, a single paper clip is retrieved from the storage compartment and delivered to a receptacle. The user retrieves the single paper clip from the receptacle quickly and easily, and the system is immediately ready to dispense another paper clip.

The systems and components of the present invention are versatile in their form and function, and readily adaptable to a number of configurations. The present invention may thus be economically produced in a wide variety of aesthetic styles and forms, catering a wide range of consumer demands.

Figure 1:
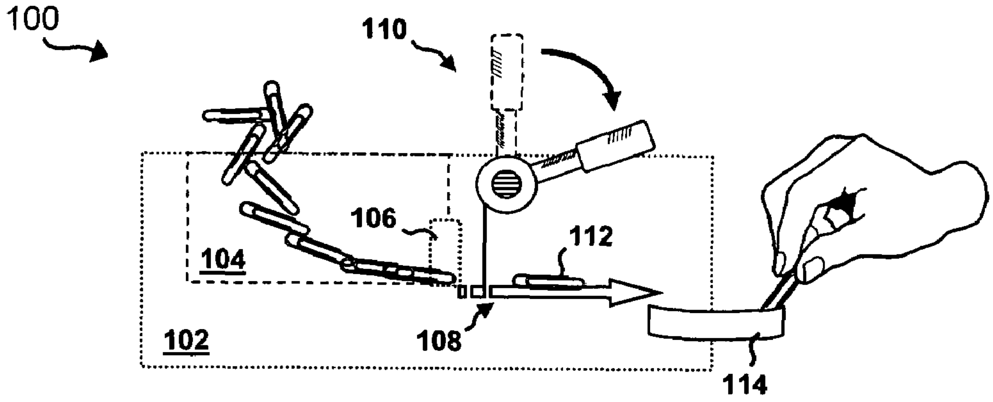
FIG. 1 is an illustration depicting one embodiment of a paper clip storage and dispenser system according to the present invention.

Referring now to FIG. 1, the present invention is described in greater detail in reference to one embodiment of a paper clip storage and dispensing system 100 according to the present invention. System 100 comprises a housing 102, within or about which a number of subsystems or components are disposed. Housing 102 may be provided in any number of shapes, sizes, contours, textures or colors to provide a desired aesthetic exterior appearance, provided that it sufficiently encloses or otherwise supports the constituent components of system 100, as described in greater detail hereinafter. A storage component 104 is disposed along or within housing 102. Component 104 is formed to collect and hold unsorted or loose paper clips for dispensing. A gate component 106 is disposed within or along housing 102 to cooperatively engage with component 104 and to facilitate removal of a single paper clip from component 104. A retrieval system 108, upon stimulus from a user-initiated actuating system 110, conducts a single paper clip 112 from gate 106 to a retrieval receptacle 114. A user may then release or deactivate the actuating system 110, which resets system 100 to dispense another paper clip while the user retrieves the paper clip.

System 100 further comprises a sorting component, one that manipulates paper clips stored in component 104 in order to facilitate one at a time dispensing of those paper clips from gate component 106. In certain embodiments, the sorting component may be provided as an independent component or system that operates in conjunction with components 104 and 106. In other embodiments, the sorting component may be provided as integrated system(s) or feature(s) within or upon storage component 104, gate component 106, or both. In one embodiment described in greater detail hereinafter, for example, storage component 104 is formed with an interior shape and contour that forces paper clips to align in a certain orientation, and gravity feeds the paper clips toward a gate component 106. As another example, one embodiment of a gate component 106 described in greater detail hereinafter is formed of an interior size and shape to constrict passage through the gate, on to retrieval system 108, to only one paper clip at a time.

Figure 2A:
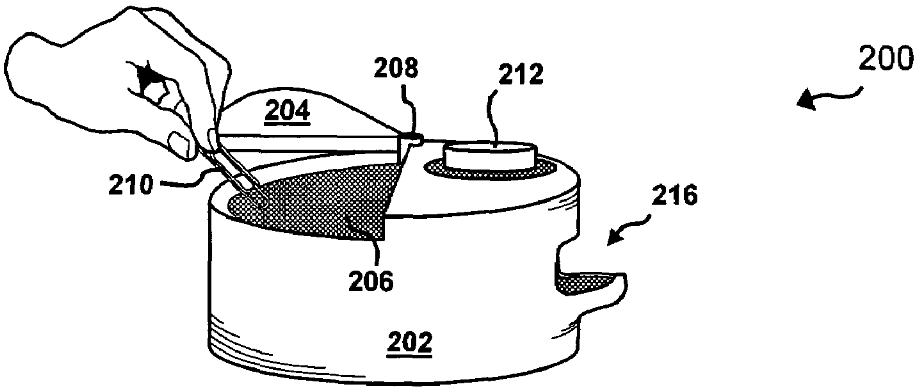
FIGS. 2*a*-2*c* are illustrations depicting another embodiment of a paper clip storage and dispenser system according to the present invention.
Figure 2B:
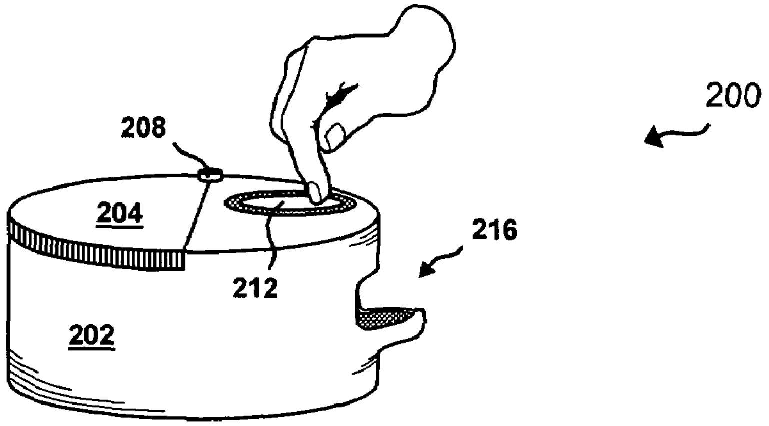
Figure 2C:
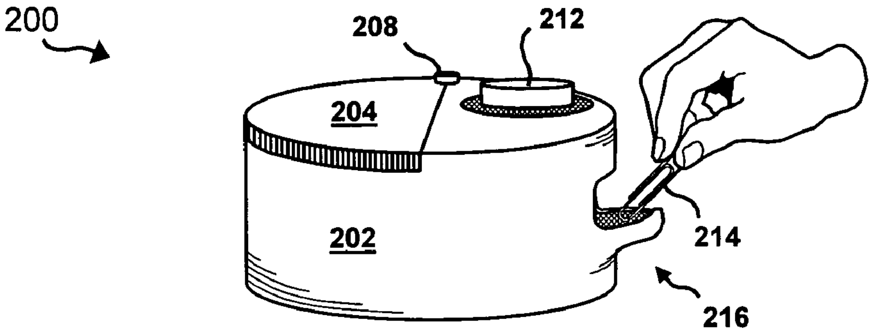

Referring now to FIGS. 2*a*-2*c*, one embodiment of a dispenser 200 illustrating certain aspects of the present invention, particularly exterior aesthetic features, is depicted. Dispenser 200 comprises a housing 202, having a quasi-oval shape. In alternative embodiments, the external shape, contour and texture may be varied greatly (e.g., cube, pyramid, mouse-shape) in accordance with the present invention. As depicted in FIGS. 2*a*-2*c*, housing 202 may comprise a lid 204, or some other suitable cover adapted to enclose a storage compartment 206. In the embodiment depicted in FIGS. 2*a*-2*c*, cover 204 is depicted as laterally rotatable about hinge 208, which is disposed along the upper outer perimeter of housing 202. In other embodiments cover 204 may comprise, for example, a vertically rotatable lid, a snap-fit lid, or a sliding cover. In still other embodiments, housing 202 may not have a cover for compartment 206, leaving it open for continuous paper clip deposit.

For the embodiment depicted in FIGS. 2*a*-2*c*, however, a user opens cover 204 to load one or more paper clip(s) 210 into compartment 206, and closes cover 204 when finished. An actuating system 212 is provided in the form of a push button disposed along the upper surface of housing 202, opposite storage compartment 206. Again, a number of alternative embodiments are comprehended, placing system 212 at any user-accessible location (e.g., adjacent compartment 206, along a side wall of housing 202) along the outer perimeter of housing 202, depending upon the specific configuration of the dispenser and its constituent components. A user activates system 212, in this case by pushing a button down, which activates or deploys a retrieval system inside housing 202. The retrieval system obtains a single paper clip 214 from the storage compartment and delivers it to a receptacle 216, from which a user may then retrieve it.

Figure 3A:
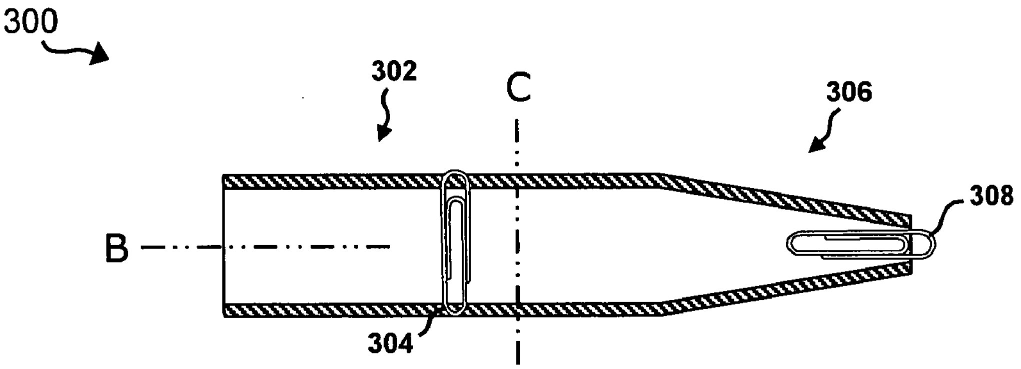
FIGS. 3*a*-3*c* are illustrations depicting one embodiment of a storage component according to the present invention.
Figure 3B:
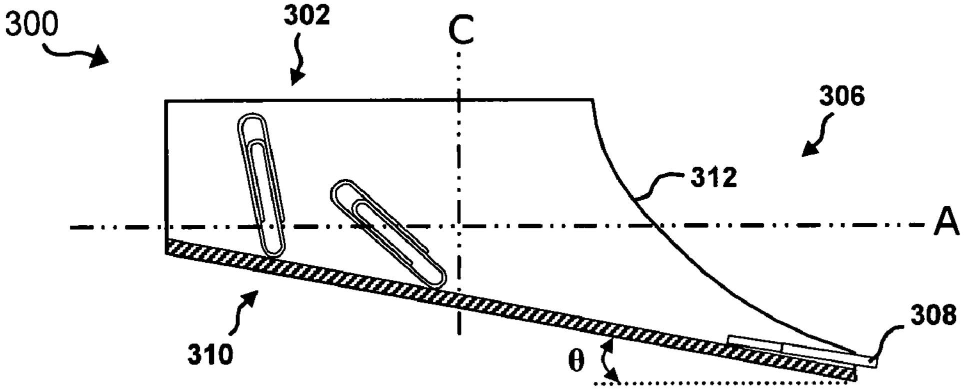
Figure 3C:
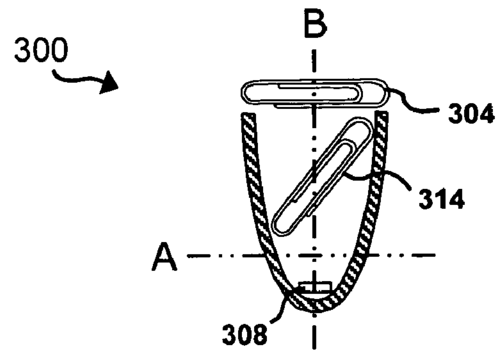

Referring now to FIGS. 3*a*-3*c*, one embodiment of a storage component 300, illustrating certain aspects of the present invention, is depicted. In this embodiment, storage component 300 is formed with an interior shape and contour that forces paper clips to align in a certain orientation, and gravity feeds the paper clips toward a gate component (not shown). Component 300 is thus formed with an integrated sorting component in order to facilitate one at a time dispensing of paper clips from the gate component. Although FIGS. 3*a*-3*c* depict paper clips aligned in a lengthwise, end-to-end orientation, other embodiments of the present invention provide a system that aligns the paper clip(s) in varied orientations (e.g., side-to-side, angular), as required or desired.

FIG. 3*a* depicts a cross-sectional view of component 300, taken along an Axis A thereof. Component 300 comprises a trough or reservoir portion 302 into which one or more paper clip(s) 304 are loaded or deposited. In alternative embodiments, there may be more than one opening for loading paper clips into component 300. For example, component 300, or a cover therefore, may comprise or form a large opening for loading multiple paper clips (e.g., new paper clips out of a box) and a smaller opening for loading a single paper clip (e.g., a used paper clip). In the embodiment depicted in FIG. 3*a*, however, portion 302 comprises a single, large opening. Portion 302 is formed having an inner opening span (or width) that is slightly smaller than the length of the smallest paper clip for which a dispenser comprising component 300 is intended. This forces paper clip 304, upon loading into component 300, to begin to align lengthwise, either partially or completely, with Axis B. Component 300 further comprises narrowing portion 306. Portion 306 tapers or otherwise narrows down toward a narrow end that mates or otherwise operatively cooperates with a gate component (not shown). At its narrow end, portion 306 is formed having an inner opening span that is slightly larger than the widest portion of a single paper clip 308 aligned along Axis B.

FIG. 3*b* depicts a cross-sectional view of component 300, taken along an Axis B thereof. Component 300 comprises a bottom portion 310, which inclines linearly at some angle θ from the narrow end of portion 306 to the opposite end of portion 302. As seen from the end opposite portion 306, bottom portion 310 slopes downward toward an associated gate component. Angle θ is of a degree sufficient to promote the movement of paper clips loaded into portion 302 toward the narrow end of portion 306. Angle θ may be varied greatly depending upon, for example, the size, contour or capacity of component 300, or the physical composition or properties of the inner surface of component 300 in relation to a paper clip loaded therein. In alternative embodiments, bottom portion 310 may be provided having a different contour to promote the movement of paper clips. For example, bottom portion 310 may be formed to incline irregularly at increasing angles, or formed having a semi-spherical or parabolic curvature. All such embodiments cause paper clips loaded into portion 302 to slide or otherwise migrate, under the force of gravity and the weight of any paper clips thereabove, down toward the narrow end of portion 306.

Component 300 further comprises a narrowing sidewall 312. Sidewall 312, in this embodiment, runs the length of portion 306 and defines the inner lateral boundary of portion 302. Sidewall 312 curves inwardly, vertically narrowing portion 306 toward its narrow end. At its narrow end, portion 306 is formed having an inner opening height that is slightly larger than the thickest portion of a single paper clip 308 aligned along Axis B. As depicted in FIG. 3*b*, sidewall 312 is semi-spherically curved. In alternative embodiments, any suitable contouring (e.g., angulations, parabolic curvature) providing the requisite narrowing may be provided.

FIG. 3*c* depicts a cross-sectional view of component 300, taken along an Axis C thereof. As described in relation to FIG. 3*a*, the trough or hopper portion of component 300 is formed having an inner opening span that is slightly smaller than the length of paper clip 304. Furthermore, component 300 is formed having a contour (i.e., a parabolic shape) that narrows down from the top of the trough to bottom portion

310, to an inner opening span that is slightly larger than the widest portion of a single paper clip 308. In alternative embodiments, other contours, such as a quasi-spherical curvature or progressive angulation, may be provided instead. All such embodiments cause, in addition to or in conjunction with other features and contours described thus far, paper clips 314 loaded into component 300 to self-align along Axis B and to slide or otherwise migrate, under the force of gravity and the weight of any paper clips there-above, down toward bottom portion 310.

Component 300 is thus formed to store a relatively large number of paper clips in some form of reservoir. The size, shape and inner contour of component 300 are provided to promote or cause paper clips stored in the reservoir to gravity feed and self-align as they approach an associated gate component. Although depicted in FIGS. 3*a*-3*c* as a trough-type structure, alternative embodiments of component 300 may provide other reservoir structures, such as bowl shapes or funnels, in accordance with the present invention. In alternative embodiments, the axis or axes along which paper clips are aligned may be varied to render paper clips to a gate component in a desired orientation.

As previously described, the present invention comprises a gate component provided to cooperatively engage with, and facilitate removal of a single paper clip from, the storage component. The gate component may be provided as a cooperatively coupled but independent structure, such as a component that would snap into place over the narrow end of component 300. Alternatively, the gate component may be formed or otherwise provided as an integrated part of a storage component. Other variations combining both approaches may also be provided.

Figure 4A:
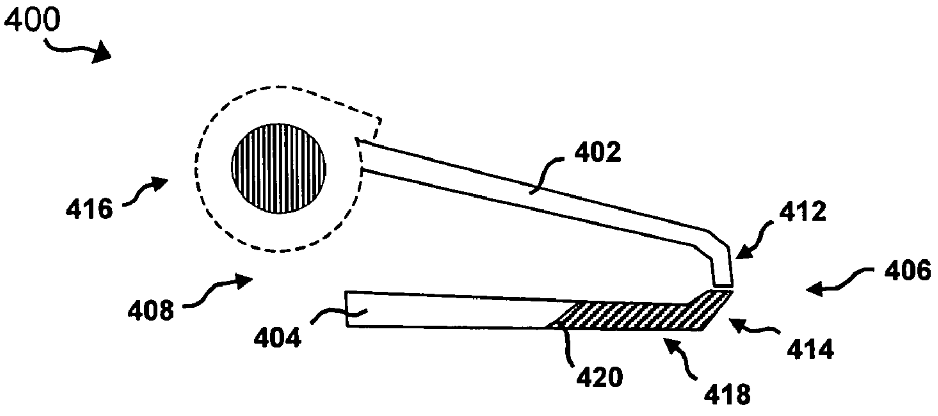
FIGS. 4*a*-4*c* are illustrations depicting one embodiment of a gate component according to the present invention.
Figure 4B:
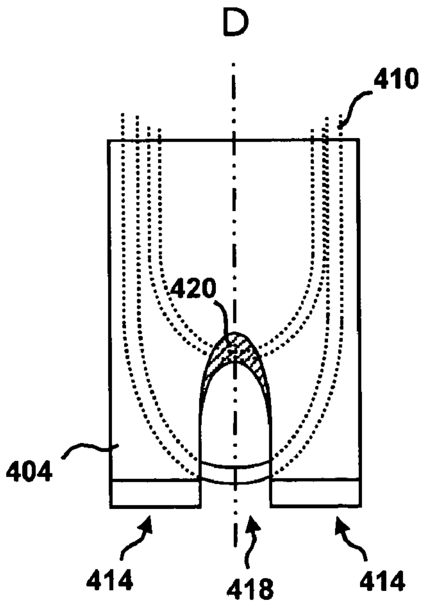
Figure 4C:
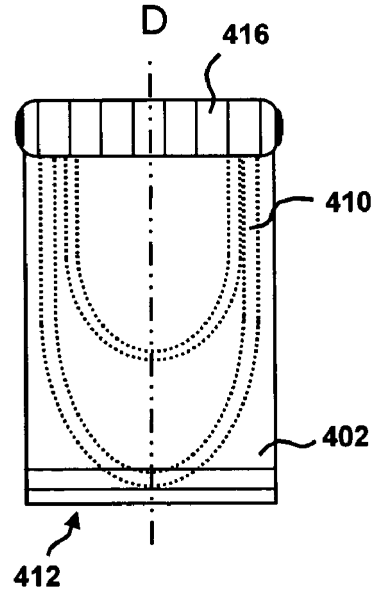

Referring now to FIGS. 4*a*-4*c*, one embodiment of a gate component 400, illustrating certain aspects of the present invention, is depicted. FIG. 4*a* depicts a cross-sectional view of component 400 taken along Axis D thereof. In this embodiment, gate component 400 comprises an upper platen 402 and a lower platen 404. The platens are formed to narrow and come together at a closed end 406 when component 400 is not dispensing a paper clip (i.e., "at rest"). Component 400 is provided having an open end 408 that is attached or otherwise cooperatively coupled to a storage component to receive paper clips therefrom. Platen 404 may incline slightly from end 406 to end 408 to facilitate gravity feeding of paper clips. Component 400 incorporates a sorting component by providing platens having an interior opening span sufficient to accommodate the width of only a single paper clip 410. Furthermore, at narrow end 406, platens 402 and 404 are formed having lip portions 412 and 414, respectively, which abut each other while component 400 is at rest. Lip portions 412 and 414 are formed such that, at narrow end 406, the interior height between platens 402 and 404 is sufficient to accommodate only a single paper clip.

In this embodiment, platen 402 and 404 are provided such that platen 404 remains stationary during removal of a paper clip, while platen 402 is displaced slightly. After a single paper clip is pulled or pushed through an opening between the platens, the platens close back together. In alternative embodiments, the upper platen may be stationary while the lower platen is displaced, or both platens may be slightly displaced. A platen that is displaced, such as platen 402 in this embodiment, remains rigid except for a flexion component 416. Component 416 provides for bending, flexing or other vertical or quasi-vertical displacement of platen 402 without deformation of the remainder of platen 402. In the embodiment depicted, component 416 comprises a spring hinge. In other embodiments, component 416 may comprise any other suitable structure, such as a flexible metal or plastic region along platen 402.

Component 400 further comprises a dispensing component 418. Component 418 provides access to the gate component by a retrieval system. In the embodiment depicted in FIGS. 4*a*-4*c*, component 418 comprises a notch formed in platen 404, at end 406. Component 418 is formed of a dimension sufficient to allow a retrieval member or mechanism to engage an outer loop of paper clip 410 to pull or push the paper clip out between lips 412 and 414. Depending upon the nature or design of the retrieval mechanism or member, component 418 may comprise one or more bevels 420 along the inner perimeter of the notch, for guiding the retrieval member into engagement with the paper clip 410.

FIGS. 5*a*-5*d* provide a cross-sectional illustration of a dispensing operation by component 400, in relation to a retrieval member 500. In FIG. 5*a*, a paper clip 410 rests within component 400, against lips 412 and 414, which are closed together. Member 500 is in some rest position, depicted here beneath component 400. In FIG. 5*b*, a user begins activation of a retrieval system of which member 500 is a part, moving member 500 along the bottom of component 400, and into a notch representing the dispensing component 418. An elevating mechanism within the retrieval system raises member 500 along bevel 420 until, as shown in FIG. 5*c*, member 500 has engaged paper clip 410 along the inner edge of its outermost wire. As the retrieval system continues to push or pull member 500 outward from component 400, member 500 forces paper clip 410 out the opening between platens 402 and 404, as depicted in FIG. 5*d*. Platen 402 is deflected upwardly to accommodate the removal of paper clip 410, as the retrieval system transports the paper clip on to a receptacle.

Referring now to FIGS. 6*a*-10*b*, various aspects of a dispenser according to the present invention are illustrated in reference to one embodiment of a retrieval system. FIGS. 6*a*-6*b* depict one embodiment of a retrieval component 600. Component 600 comprises an "A" bracket rotatable about a pivot 602. Component 600 further comprises a retrieval member 604, disposed along an upper arm of component 600. Member 604 is provided to function similarly to member 500—engaging and pushing or pulling paper clips from a gate component. Component 600 is rotatable, about pivot 602, between two positions, up and down. Component 600 is provided to move member 604 in either direction along a lower inner surface 606 of a retrieval channel 608, which is shown in cross-sectional view.

In its up position, as depicted in FIG. 6*a*, component 600 raises member 604 up through a slot 610 formed along the bottom center of channel 608, to pull or push a paper clip along surface 606. Slot 610 is of a dimension sufficient to guide and support member 604 as it moves back and forth, while leaving enough of the upper portion of member 604 exposed to engage with a paper clip. In down position, as depicted in FIG. 6*b*, component 600 lowers member 604 down through slot 610, somewhere below surface 606. Component 600 is thus rendered free to move back and forth without disrupting any paper clips that may be in channel 608.

Referring now to FIGS. 7*a*-7*b*, one embodiment of a retrieval component 700 is depicted. FIG. 7*a* depicts component 700 in a side view, while FIG. 7*b* depicts component 700 in a front view. Component 700 comprises an "A" bracket 702 rotatable about a pivot 704. In this embodiment, pivot 704 comprises a ratcheting hinge that switches bracket 702 between up and down positions upon application of some torque or pressure applied along bracket 702. Component 700 further comprises an upper stage portion 706, orthogonally disposed along the outermost portion of the upper arm of bracket 702. Portion 706 is depicted in FIGS. 7*a*-7*b* in a partial cross-sectional view.

A retrieval member 708 is disposed along portion 706. In this embodiment, member 708 comprises a spring-loaded retractable stylus housed within portion 706. Member 708 is provided as a retractable system in order to facilitate its operation in conjunction with a gate assembly similar to component 400. In alternative embodiments, member 708 may be provided in some other form, according to the form and design of other components in a dispenser, in accordance with the present invention. For example, member 708 may comprise a fixed, solid projection formed as a contiguous part of portion 706, or a partially deformable structure secured to portion 706. Other embodiments in accordance with the present invention are further comprehended.

In component 700, member 708 is secured, through an aperture in the upper surface of portion 706, into a piston-like chamber 710 within portion 706. Chamber 710 comprises a spring 712, disposed under member 708. Spring 712 biases member 708 to a position fully extended from portion 706. Under pressure upon member 708, however, spring 712 yields slightly to allow member 708 to retract into chamber 710. Member 708 may comprise a chamfered portion 714 along its upper end, facilitating its cooperation with a beveled portion of a gate assembly.

Figure 8A:
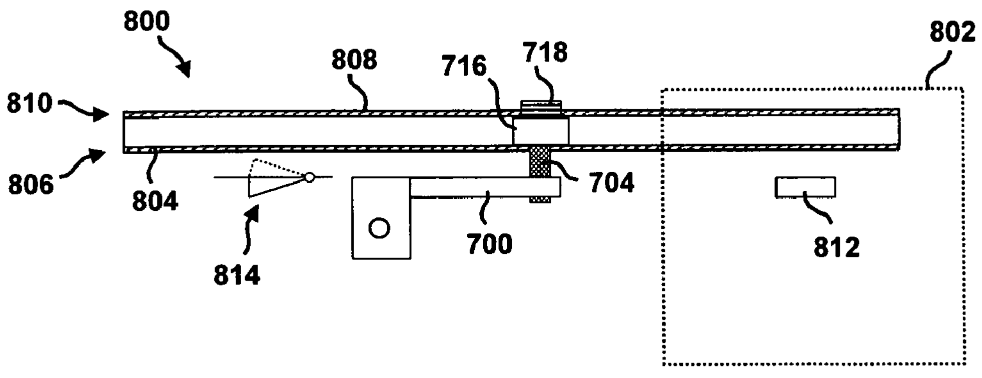
FIGS. 8*a*-8*b* are illustrations depicting certain aspects of one embodiment of a retrieval system according to the present invention.

Pivot 704 is secured to a sled component 716. Component 716 is secured, via a translational component 718, to an actuating system portion 720. An actuating system moves component 700, via sled component 716, back and forth between a gate component and a receptacle. This is described in greater detail now with reference to FIGS. 8*a*-10*b*. FIG. 8*a* depicts a top view of sled component 716 housed within an actuating channel 800. Channel 800 is formed to enclose and confine component 716 such that component 716 is free only to slide along the interior length of channel 800, between a receptacle 802 and a gate component (not shown). A retrieval component 700 is coupled to sled component 716 via pivot 704, which moves freely along an aperture 804 formed in a sidewall 806 of channel 800. Similarly, translational component 718 is coupled to sled component 716 and moves freely along an aperture 808 formed in an opposite sidewall 810 of channel 800.

An upper gate assembly 812 is disposed beneath receptacle 802, along the path of component 700, to switch component 700 to a down position, as described in greater detail hereinafter. A lower gate assembly 814 is disposed near gate component end of channel 800, along the path of component 700, to switch component 700 to an up position. Lower assembly 814 is a retractable switch. Assembly 814 retracts or otherwise collapses as component 700 is moved from receptacle 802 toward the gate component end of channel 800. Once component 700 passes completely by, assembly 814 deploys or otherwise reopens to a locked position. As component 700 is moved from the gate component end of channel 800 toward receptacle 802, assembly 814 engages the lower arm of component 700 to switch it to an up position. Assemblies 812 and 814 may be formed as part of, affixed to, or otherwise coupled to any suitable structure providing secure support for the assemblies and their operation. For example, in one embodiment, assembly 812 may be formed as an L-shaped extension from a bottom surface of receptacle 802. In another embodiment, for example, assembly 814 may be disposed within a support post that extends upwardly from the lower inner surface of a housing.

Figure 8B:
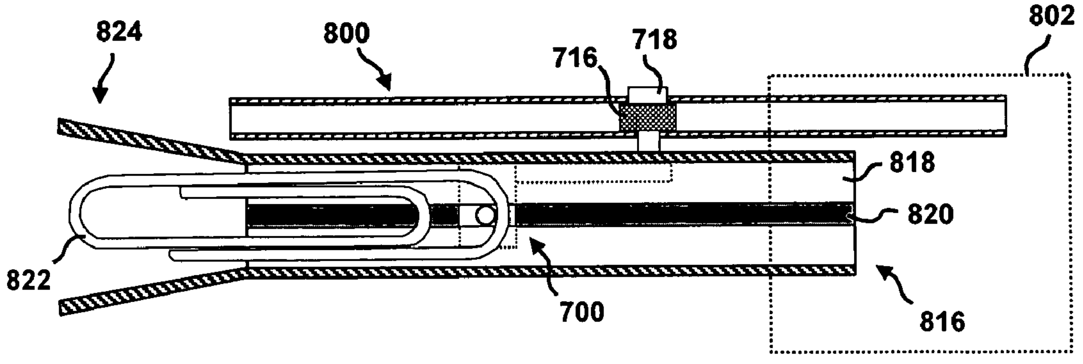

FIG. 8*b* depicts a top view of sled component 716 and component 700 in relation to a retrieval channel 816. Component 700 moves its retrieval member 708 in either direction along a lower inner surface 818 of retrieval channel 816. In its up position, component 700 raises member 708 up through a slot 820 formed along the bottom center of channel 816, to pull or push a paper clip along surface 818. Slot 820 is of a dimension sufficient to guide and support member 708 as it moves back and forth, while leaving enough of the upper portion of member 708 exposed to engage with a paper clip 822. Member 708 retrieves paper clip 822 from a gate component 824. Channel 816 is coupled to, or otherwise disposed in close operative proximity to, component 824. Component 700 moves paper clip 822 along channel 816, from component 824 to receptacle 802, as described hereinafter. Channel 816 may be fully enclosed, or have an open top, and is formed of a width and depth sufficient to accommodate only a single paper clip 822 at a time.

Figure 9A:
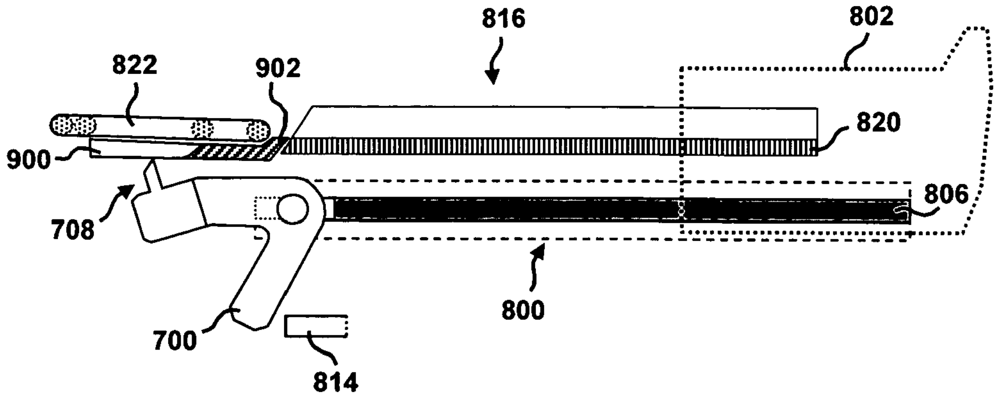
FIGS. 9*a*-9*c* are illustrations depicting certain aspects of one embodiment of a retrieval system according to the present invention.
Figure 9B:
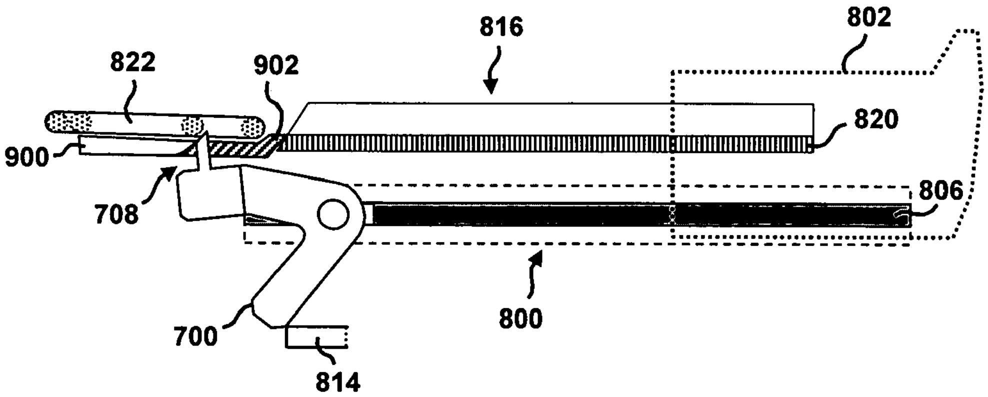
Figure 9C:
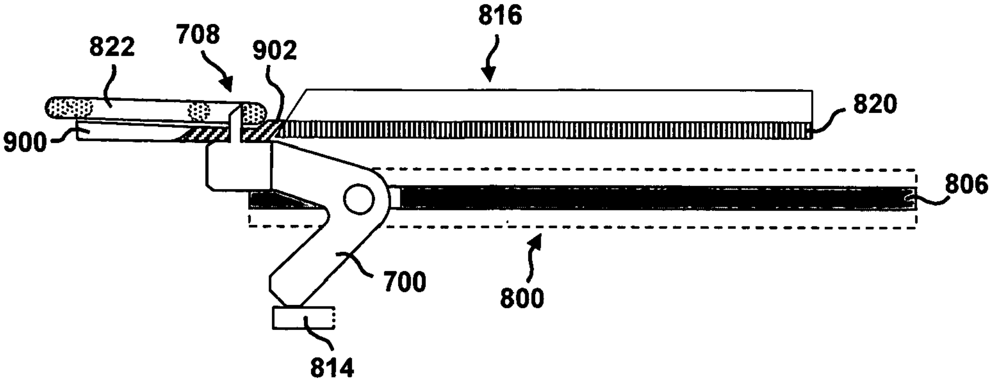

Referring now to FIGS. 9*a*-9*c*, a cross-sectional illustration of component 700 retrieving paper clip 822 from gate component 824 is depicted. In this embodiment, when a dispenser within which such components and systems are housed is at rest (i.e., inactive), component 700 is positioned in a down position underneath a lower platen 900 of component 824, as depicted in FIG. 9*a*. Paper clip 822 rests within component 824, the platens of which are closed together. In FIG. 9*b*, a user begins activation of the retrieval system of which component 700 is a part, moving member 708 along the bottom of platen 900, and into a notch 902 formed therein. The bottom arm of component 700 engages assembly 814, which begins to rotate component 700 about pivot 704 into an up position. This moves member 708 upward along notch 902 until, as shown in FIG. 9*c*, member 708 has engaged paper clip 822 along the inner edge of its outermost wire. Responsive to the user's continued actuation, the retrieval system (i.e., component 700) forces paper clip 822 out from component 900 and moves it down channel 816 toward receptacle 802.

Figure 10A:
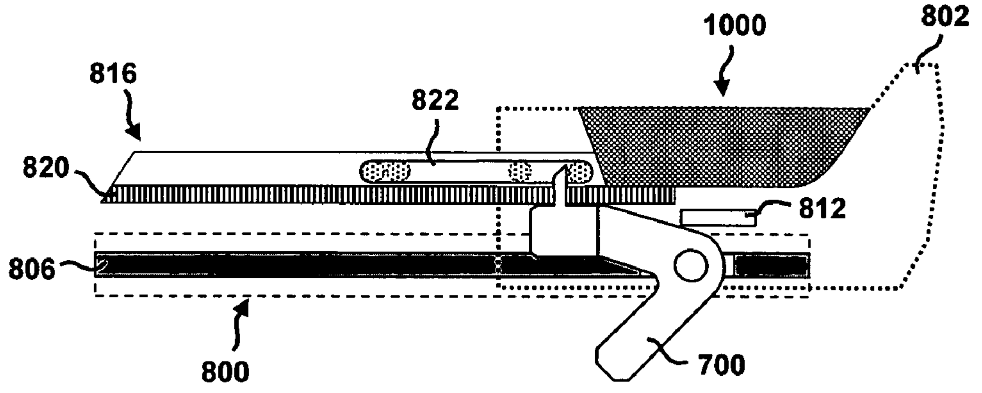
FIGS. 10*a*-10*b* are illustrations depicting certain aspects of one embodiment of a retrieval system according to the present invention.
Figure 10B:
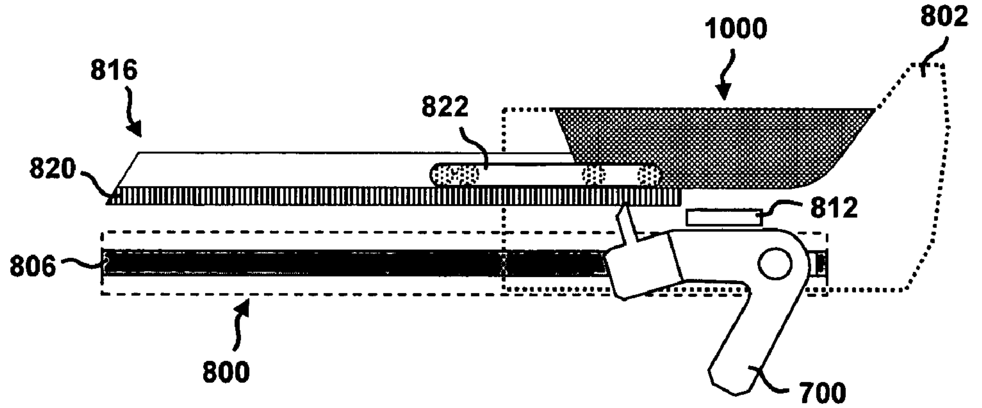

Referring now to FIGS. 10*a*-10*b*, a cross-sectional illustration of component 700 depositing or delivering paper clip 822 to receptacle 802 is depicted. In FIG. 10*a*, user activation of the retrieval system, of which component 700 is a part causes member 708 to move paper clip 822 along channel 816 toward receptacle 802. As component 700 nears the end of channel 800, bringing paper clip 822 into proximity of a retrieval cavity 1000 formed in receptacle 802, the upper arm of component 700 begins to contact and engage assembly 812. As component 700 approaches the end of channel 800, as shown in FIG. 10*b*, component 700 is switched into a down position. This disengages member 708 from paper clip 822, leaving the paper clip accessible to the user via cavity 1000. Once the user stops activation of the retrieval system, component 700 is left in a down position to return to its at rest location underneath component 824.

Figure 11A:
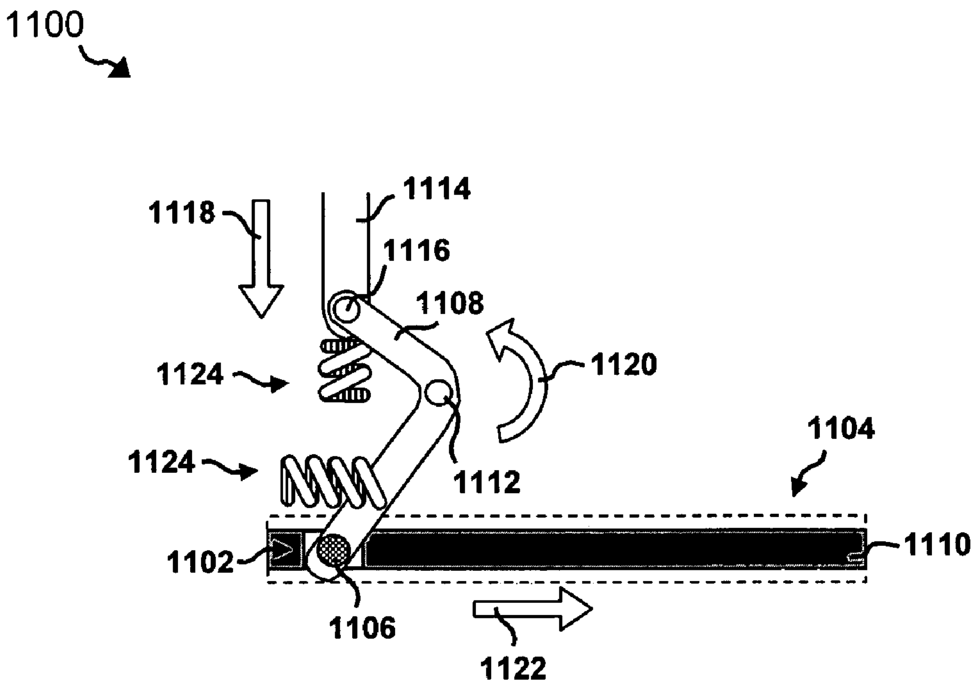
FIGS. 11*a*-11*b* are illustrations depicting certain aspects of one embodiment of an actuating system according to the present invention.
Figure 11B:
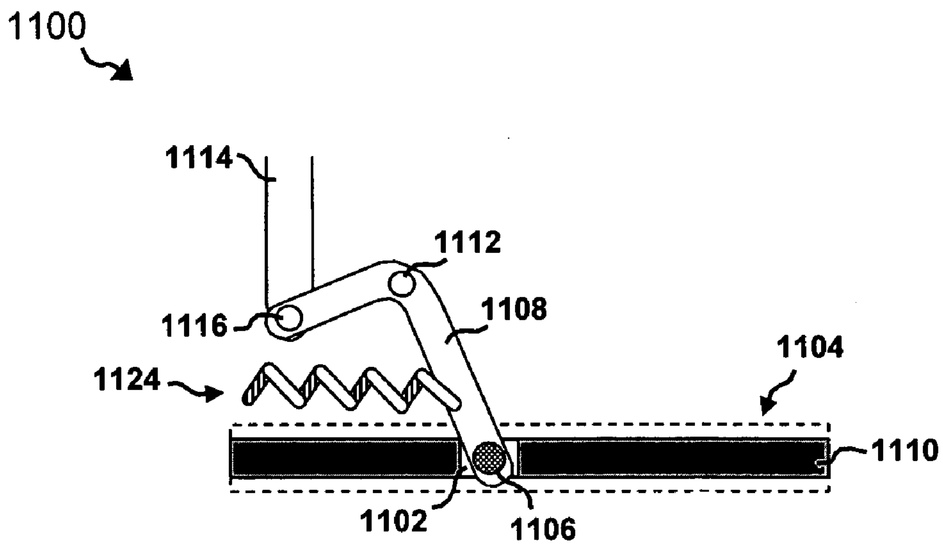

Thus, as depicted herein, a retrieval system operates, under user activation or actuation, to remove a single paper clip from a storage component, via a gate component, and deliver it to a receptacle. Although many embodiments of an activation or actuating system are comprehended by the present invention, one embodiment of an actuating assembly or system 1100, illustrating certain aspects of the present invention, is described now with reference to FIGS. 11*a*-11*b*. FIG. 11*a* depicts a side view of sled component 1102, similar to component 716, housed within an actuating channel 1104. Channel 1104 is formed to enclose and confine component 1102 such that component 1102 is free only to slide along the interior length of channel 1104. A retrieval component is coupled to sled component 1102. A first translational component 1106 (e.g., pivot, bearing, ball and socket joint) couples component 1102 to a movement member 1108. Component 1106 moves along an aperture 1110 formed in a sidewall of channel 1104.

Member 1108 comprises an appropriately shaped (e.g., L-shaped, A-shaped) bracket fixed for rotation about pivot 1112. The end of member 1108 opposite component 1106 is coupled to an actuating member 1114 via a second translational component 1116 (e.g., pivot, bearing, ball and socket joint). Member 1114 comprises a bracket, beam or other appropriate structure extending from some user-operable actuating mechanism (e.g., push-button, lever). As shown in FIG. 11*a*, system 1100 starts in an "at-rest" position where component 1102 remains at a position within channel 1104 adjacent to member 1114. As a user begins to actuate or activate assembly 1100—by, for example, pushing down a button coupled to the top of member 1114—the downward force 1118 applied to member 1108, via component 1116, causes a counter-clockwise rotation 1120 of member 1108 about fixed pivot 1112. This, in turn, causes an outward movement of the lower arm of member 1108 along the path of channel 1104. Correspondingly, component 1106 forces, through aperture 1110, an outward movement 1122 of sled 1102 along the inner portion of channel 1104.

System 1100 further comprises one or more deformable or resilient retention or displacement member(s) 1124, such as springs or rubber bands, coupled to one or more constituent members of system 1100. Member(s) 1124 are disposed or coupled in such a way that they are compressed or stretched when system 1100 is actuated (i.e., when force 1118 is applied). Upon reaching some maximum displacement, or once force 1118 is removed, members 1124 contract or expand to force the constituent members of system 1100 back to their "at-rest" position. This returns sled 1102 back to its starting position as well.

In other embodiments, the constituent members of system 1100 may be provided in alternate orientations with alternate operations. For example, system 1100 may be provided such that the rest position of sled 1102 is at the opposite end of channel 1104, and that actuation system 1100 pulls sled 1102 from that position. As another example, the orientation or shape of member 1114 may be altered, or coupled to additional translational elements, to accommodate a different position for the actuating mechanism (e.g., push-button, lever). All such variations are comprehended hereby.

In fact, all embodiments described herein are presented for purposes of illustration and explanation only. The specific compositions, configurations, orientations and operations of various components, systems and members may be provided in a number of ways in accordance with the present invention. For example, all portions of a dispenser system according to the present invention may be provided as injection molded plastic components, in order to provide a low-cost consumer product. In another embodiment, certain components may be formed of metal to provide a desired rigidity or operational strength. The location of actuating mechanism in relation to the storage component and receptacle may be varied to provide a more ergonomic design. In another alternative embodiment, a notch may be formed in an upper platen of the gate component, through which a retrieval member may extend to engage a paper clip. Another alternative embodiment provides side-to-side alignment of paper clips, which may then be retrieved along a side span or an end loop thereof. These and other similar variations in accordance with the present invention are thus comprehended hereby.

Thus, the embodiments and examples set forth herein are presented to best explain the present invention and its practical application and to thereby enable those skilled in the art to make and utilize the invention. As previously explained, those skilled in the art will recognize that the foregoing description and examples have been presented for the purpose of illustration and example only. The description as set forth is not intended to be exhaustive or to limit the invention to the precise form disclosed. For example, the principles and teachings of the present invention may be generalized to provide a single dispenser for several sizes of paper clips, or specialized to provide a dispenser for a single size or alternate geometry paper clip (e.g., quasi-triangular plastic paper clip). Many other modifications and variations are possible in light of the above teaching without departing from the spirit and scope of the following claims.

What is claimed is:

1. A manually-operated system for one-at-a-time paper clip dispensing, the system comprising:
- a housing;
- a retrieval receptacle disposed along the housing;
- a storage component disposed along the housing, adapted to receive loose paper clips;
- a gate component operably coupled to the storage component;
- a sorting component disposed within at least one of the storage component and the gate component;
- an actuating system disposed along the housing; and
- a retrieval system, disposed between the receptacle and the storage component, adapted to retrieve a single paper clip from the gate component and deliver the paper clip to the receptacle responsive to the actuating system;
- wherein the retrieval system comprises a retrieval component adapted to move a paper clip along a retrieval channel; and
- wherein the retrieval component comprises an A-shaped bracket adapted to move between an up position and a down position.

2. The system of claim 1, wherein the housing further comprises a cover adapted to enclose the storage component.

3. The system of claim 1, wherein the sorting component is formed as part of the storage component.

4. The system of claim 1, wherein the sorting component is formed as part of the gate component.

5. The system of claim 1, wherein the storage component comprises a reservoir.

6. The system of claim 1, wherein the storage component narrows down toward its bottom portion.

7. The system of claim 1, wherein the storage component narrows down toward the gate component.

8. The system of claim 1, wherein the storage component comprises an upper open area having a span less than a length of a paper clip.

9. The system of claim 1, wherein the storage component comprises a bottom portion that slopes downwardly toward the gate component.

10. The system of claim 1, wherein the storage component further comprises a narrowing sidewall.

11. The system of claim 1, wherein the storage component comprises a curved inner contour.

12. The system of claim 1, wherein the storage component comprises an angled inner contour.

13. A manually-operated system for one-at-a-time paper clip dispensing, the system comprising:

a housing;

a retrieval receptacle disposed along the housing;

a storage component disposed along the housing and adapted to receive loose paper clips;

a gate component operably coupled to the storage component;

a sorting component disposed within at least one of the storage component and the gate component;

an actuating system disposed along the housing; and a retrieval system, disposed between the receptacle and the storage component, adapted to retrieve a single paper clip from the gate component and deliver the paper clip to the receptacle responsive to the actuating system;

wherein the gate component comprises:

an upper platen;

a lower platen; and a flexion component.

14. The system of claim 13, wherein the upper platen and lower platen have downwardly and upwardly turning lips, respectively, that close together until a paper clip is forced out from the gate component.

15. The system of claim 13, wherein the flexion component is disposed along the upper platen.

16. The system of claim 13, wherein the flexion component is disposed along the lower platen.

17. The system of claim 13, wherein the platens have an interior opening span sufficient to accommodate a width of only a single paper clip.

18. The system of claim 13, wherein the platens have an interior opening span sufficient to accommodate a thickness of only a single paper clip.

19. The system of claim 13, wherein the gate component further comprises a dispensing component.

20. The system of claim 19, wherein the dispensing component further comprises a notch formed in an end of a platen closest that platen's lip.

21. The system of claim 1, wherein the actuating system comprises a push-button.

22. The system of claim 1, wherein the actuating system comprises a lever.

23. The system of claim 1, wherein the retrieval component comprises a retrieval member that moves a paper clip from the gate component along the retrieval channel.

24. The system of claim 23, wherein the retrieval channel comprises a slot formed therein along which the retrieval member travels.

25. The system of claim 23, wherein the retrieval member comprises a retractable system.

26. The system of claim 23, wherein the retrieval member comprises a fixed projection.

27. The system of claim 1, further comprising a sled component intercoupled between the retrieval component and the actuating system, adapted to move the retrieval component responsive to the actuation system.

28. The system of claim 27, further comprising a translational component coupling the sled component to an actuating assembly.

29. The system of claim 1, wherein the sorting component is adapted to align loose paper clips in an end-to-end orientation.

30. The system of claim 1, wherein the sorting component is adapted to align loose paper clips in a side-to-side orientation.

31. A paper clip dispenser comprising:

a housing;

a retrieval receptacle disposed along a side portion of the housing;

a trough-shaped, downwardly sloping storage component disposed along the housing, adapted to receive loose paper clips through an upper opening that forces the loose paper clips into at least partial alignment with a desired axis;

a gate component operably coupled to the storage component at a bottom of its downward slope, adapted to dispense paper clips one at a time;

an actuating system disposed along the housing; and a retrieval system, having a retrieval channel disposed between the receptacle and the storage component, and having a retrieval component with a retrieval member coupled to an upper portion thereof the retrieval component adapted to retrieve a paper clip from the gate component using the retrieval member and to move the paper clip to the receptacle responsive to the actuating system;

wherein the retrieval component comprises an A-shaped bracket adapted to move between an up position and a down position.

* * * * *